(12) United States Patent
I et al.

(10) Patent No.: US 9,219,356 B2
(45) Date of Patent: Dec. 22, 2015

(54) ELECTRICAL JUNCTION BOX

(71) Applicant: Yazaki Corporation, Tokyo (JP)

(72) Inventors: Sunsoku I, Makinohara (JP); Takaaki Kakimi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 32 days.

(21) Appl. No.: 14/194,864

(22) Filed: Mar. 3, 2014

(65) Prior Publication Data

US 2014/0246215 A1    Sep. 4, 2014

(30) Foreign Application Priority Data

Mar. 4, 2013    (JP) .................................. 2013-041773

(51) Int. Cl.
*H02G 3/08* (2006.01)

(52) U.S. Cl.
CPC .............. *H02G 3/081* (2013.01); *H02G 3/088* (2013.01)

(58) Field of Classification Search
USPC .......................................................... 174/50
See application file for complete search history.

(56) References Cited

U.S. PATENT DOCUMENTS 8,309,847 B2 * 11/2012 Aburaya et al. ................. 174/50

FOREIGN PATENT DOCUMENTS

JP     2010-124562 A    6/2010

* cited by examiner

*Primary Examiner* — Dhirubhai R Patel
(74) *Attorney, Agent, or Firm* — Locke Lord LLP

(57) ABSTRACT

An electrical junction box provides a frame and a cover that covers an opening portion of the frame. There is a difference of elevation in an edge of the frame, and the edge includes a lower portion, a higher portion, and an inclination portion. A double wall formed of an exterior wall and an interior wall and positioning the edge of a peripheral wall between the exterior wall and the interior wall is provided to the cover. There is a difference of elevation in the edge of the interior wall similarly the frame, and the edge includes the lower portion, the higher portion, and the inclination portion. Also, a lapping amount between the peripheral wall and the interior wall at the inclination portion is formed larger than a lapping amount at the lower portion.

2 Claims, 5 Drawing Sheets

ELECTRICAL JUNCTION BOX

TECHNICAL FIELD

The invention relates to an electrical junction box which is suitable for being incorporated in a vehicle.

BACKGROUND ART

Although an electrical junction box incorporated in a vehicle has several structures such as an electrical junction box illustrated in FIGS. 4-5, there is a structure that has a difference of elevation in height at an edge of a frame (see Japanese Unexamined Patent Publication No. 2010-124562). Also, FIG. 4 is a cross sectional view indicating a conventional electrical junction box, and FIG. 5 is a perspective view indicating a part of a cover illustrated in FIG. 4.

An electrical junction box 301 illustrated in FIG. 4 provides a frame 302 that various components (not illustrated) such as a relay, a fuse, or the like are accommodated, and a cover 303 attached to the frame 302 and covering an opening portion 320 of the frame 302.

The frame 302 described above includes a peripheral wall 321 and the opening portion 320 that is surrounded by an edge 321a of the peripheral wall 321. As described above, there is a difference of elevation at the edge of the frame 302, namely the edge 321a of the peripheral wall 321, and the edge 321a includes a lower portion 304, a higher portion 306, an inclination portion 305 connected between the lower portion 304 and the higher portion 306. The lower portion 304 and the higher portion 306 extend to a vertical direction (arrow X or arrow Z) with respect to a mounting direction (arrow Y) of the cover 303. Also, the higher portion 300 is placed upper than the lower portion 304 in a state that mounts the electrical junction box 301 on a vehicle.

The cover 303 includes a ceiling wall 334, a peripheral wall 335 that is erected from an outer edge of the ceiling wall 334, and a double wall 333 that is provided to a lower end of the peripheral wall 335. The double wall 333 is formed of an exterior wall 331 and an interior wall 332, and the edge 321a of the peripheral wall 321 in the frame 302 is positioned between the exterior wall 331 and the interior wall 332. Also, as illustrated in FIG. 5, the edge 332a of the interior wall 332 includes a lower portion 314, a higher portion 316, and an inclination portion 315 that connects between the lower portion 314 and the higher portion 316. The lower portion 314, the inclination portion 315, and the higher portion 316 are respectively provided to a position of the lower portion 304, the inclination portion 305, and the higher portion 306 in the frame 302.

According to the electrical junction box 301 described above, in a state that the cover 303 is attached to the frame 302, a lapping amount between the peripheral wall 321 of the frame 302 and the interior wall 332 of the cover 303 is formed with a constant width over an entire periphery of the frame 302 and the cover 303. In other words, as illustrated in FIG. 4, a lapping amount "a" at the lower portions 304 and 314, a lapping amount "a" at the inclination portions 305 and 315, and a lapping amount "a" at the higher portions 306 and 316 are equal. Similarly, a lapping amount between the peripheral wall 321 of the frame 302 and the exterior wall 331 of the cover 303 are formed with a constant width over the entire periphery of the frame 302 and the cover 303.

In the conventional electrical junction box 301 described above, there is a problem that water easily enters from the neighborhood of the inclination portions 305 and 315 to the frame 302. For example, as illustrated with an arrow F in FIGS. 4-5, when strong water such as high pressure cleaning water splashes near the inclination portions 305 and 315, there is a problem that the water enters from the exterior wall 331 of the cover 303 and the peripheral wall 321 of the frame 302, flows to the higher portions 306 and 316, blows through between the interior wall 332 of the cover 303 and the peripheral wall 321 of the frame 302 into the frame 302, and splashes to the relay, the fuse, or the like.

Furthermore, when a packing is attached between the exterior wall 331 and the interior wall 332 of the cover 303, the problem of water entering described above is prevented. Meanwhile, when the packing is attached, a new problem that components costs and assembling costs are increased is generated.

SUMMARY OF THE INVENTION

In view of above drawbacks, the present invention has the purpose to provide an electrical junction box that can prevent blowing from an engaged portion between a frame and a cover into the frame without utilizing a packing.

According to a first aspect of the present invention, the electrical junction box provides: a frame including a peripheral wall and an opening portion surrounded by an edge of the peripheral wall; and a cover attached to the frame and covering the opening portion; the edge of the peripheral wall including: a lower portion; a higher portion; and an inclination portion connecting between the lower portion and the higher portion; a part of the cover overlapping near the edge of the peripheral wall, wherein a lapping amount at the inclination, portion is formed larger than a lapping amount between the peripheral wall and the cover at the lower portion.

According to a second aspect of the present invention, the electrical junction box according to the first aspect of the present invention, wherein a double wall formed of an exterior wall and an interior wall and positioning the edge of the peripheral wall between the exterior wall and the interior wall is provided to the cover, and wherein a lapping amount at the inclination portion is formed larger than a lapping amount between the peripheral wall and the interior wall at the lower portion.

According to a first aspect of the present invention, the lapping amount at the inclination portion is formed larger than the lapping amount between the peripheral wall and the cover at the lower portion so that, even if water entering from the engaged portion between the frame and the cover reaches to a lapping portion between the peripheral wall and the cover at the inclination portion, strength of the water at the lapping portion is weakened and the water slowly falls by own weight. Therefore, without utilizing the packing, the electrical junction box that may prevent that water blows from the engaged portion between the frame and the cover into the frame may be provided.

According to a second aspect of the present invention, the lapping amount at the inclination portion is formed larger than the lapping amount between the peripheral wall and the cover at the lower portion so that, even if water entering from the engaged portion between the peripheral wall and the cover reaches to a lapping portion between the peripheral wall and the cover at the inclination portion, strength of the water at the lapping portion is weakened and the water slowly falls by own weight. Therefore, without utilizing the packing, the electrical junction box that may prevent that water blows from the engaged portion between the frame and the cover into the frame may be provided.

DESCRIPTION OF THE EMBODIMENTS

Figure 1:
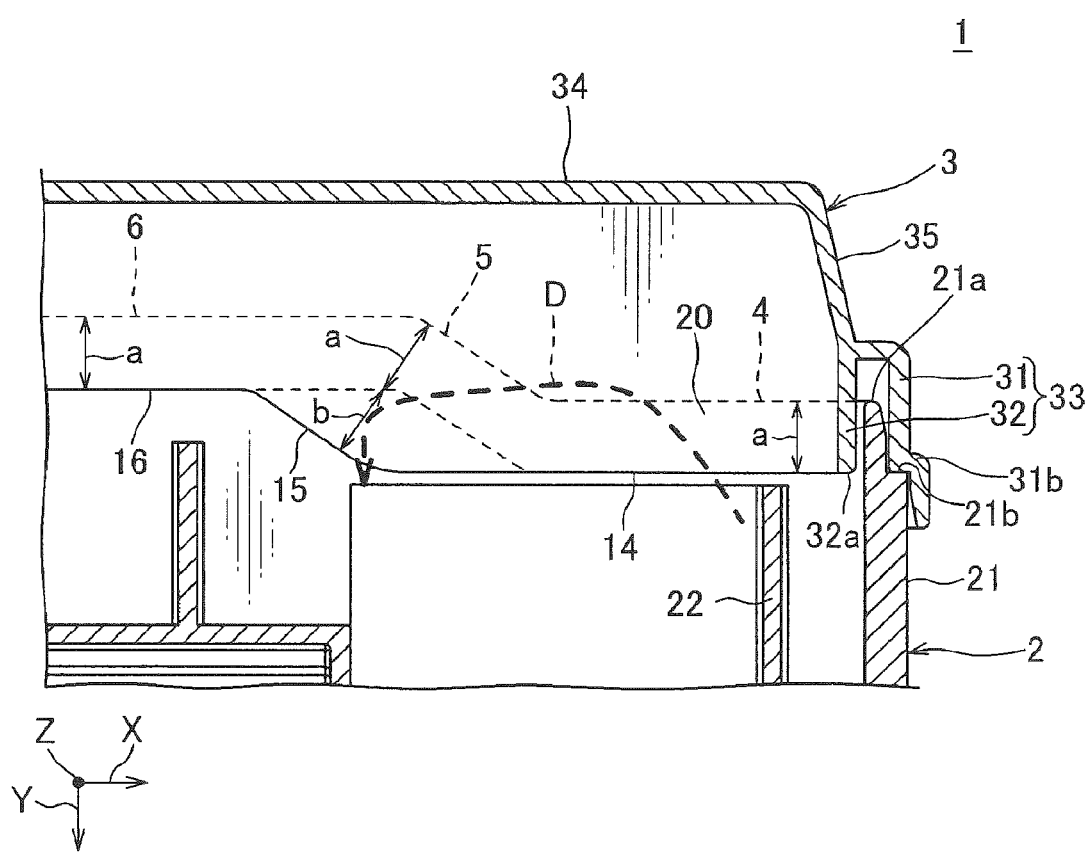
FIG. 1 is a cross sectional view indicating an electric junction box in accordance with an exemplary embodiment of the invention.
Figure 2:
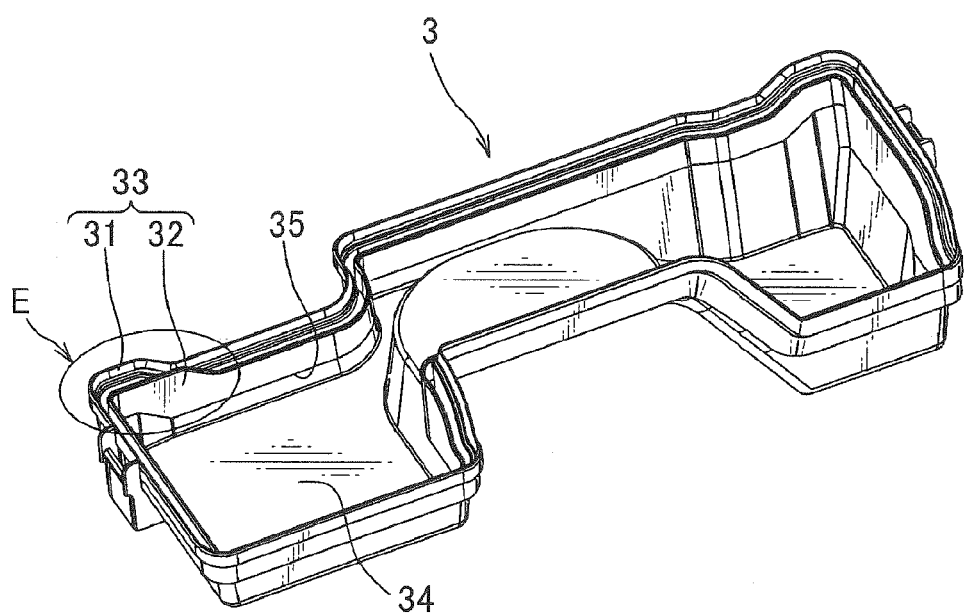
FIG. 2 is a perspective view indicating a cover illustrated in FIG. 1.
Figure 3:
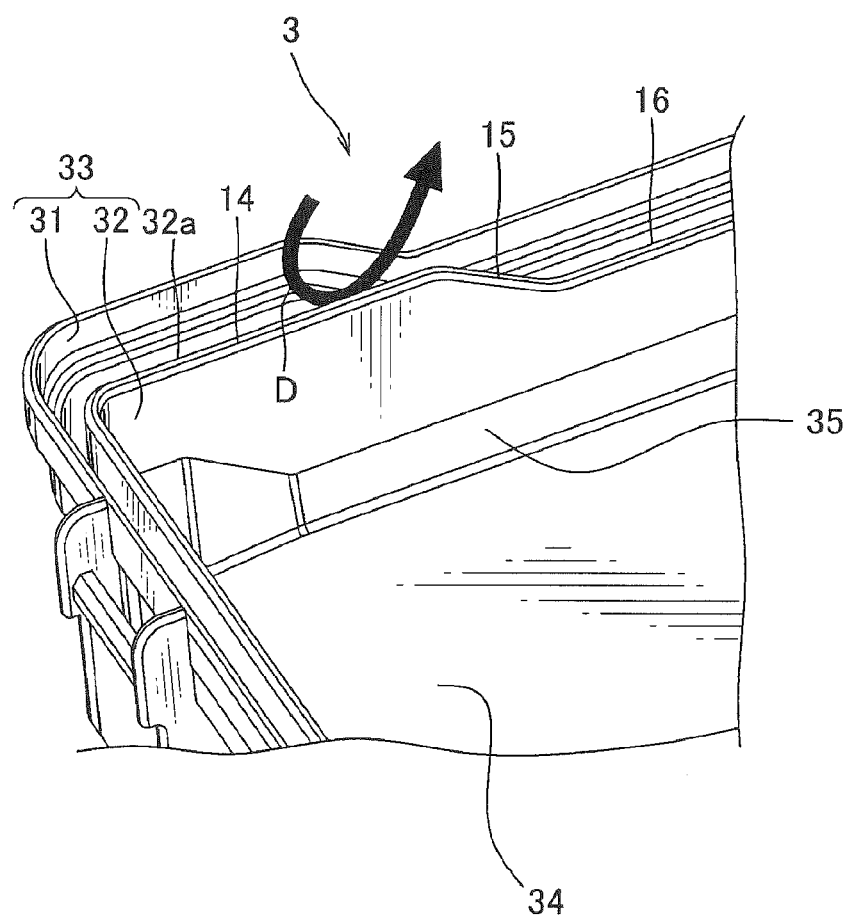
FIG. 3 is an enlarged view indicating an E portion illustrated in FIG. 2.

An electrical junction box in accordance with one embodiment of the present invention is described by referring to FIGS. 1-3.

An electrical, junction box 1 illustrated in FIG. 1 provides a synthetic resign-made frame 2 accommodated various components (not illustrated) such as a relay, a fuse, or the like, and a synthetic resign-made cover 3 attached to upper end of the frame 2 and covering an opening portion 20 of the frame 2.

The frame 2 described above includes a peripheral wall 21 and the opening portion 20 that is surrounded by an edge 21a of the peripheral wall 21, and a waterproofing wall 22 that is partially provided in the peripheral wall 21. The various components such as the relay, the fuse, or the like are accommodated inner side than the waterproofing wall 22. Also, there is a difference of elevation at the edge of the frame 2, namely the edge 21a of the peripheral wall 21, and the edge 21a includes a lower portion 4, a higher portion 6, an inclination portion 5 connected between the lower portion 4 and the higher portion 6. The lower portion 4 and the higher portion 6 extend to a vertical direction (arrow X or arrow Z) with respect to a mounting direction (arrow Y) of the cover 3. Also, the higher portion 6 is placed upper than the lower portion 4 in a state that mounts the electrical junction box 1 on a vehicle.

The cover 3, as illustrated in FIG. 2, includes a ceiling wall 34, a peripheral wall 35 that is erected from an outer edge of the ceiling wall 34, and a double wall 33 that is provided to a lower end of the peripheral wall 35. The double wall 33 is formed of an exterior wall 31 and an interior wall 32, and the edge 21a of the peripheral wall 21 in the frame 2 is positioned between the exterior wall 31 and the interior wall 32. Also, each of the exterior wall 31 of the cover 3 and the peripheral wall 21 of the frame 2 is provided step portions 31b and 21b abutting each other. Also, as illustrated in FIG. 3, the edge 32a of the interior wall 32 includes a lower portion 14, a higher portion 16, and an inclination portion 15 that connects between the lower portion 14 and the higher portion 16. The lower portion 14, the inclination portion 15, and the higher portion 16 are respectively provided to a position of the lower portion 4, the inclination portion 5, and the higher portion 6 in the frame 2.

According to the electrical junction box 1 described above, in a state that the cover 3 is attached to the frame 2, a lapping amount between the peripheral wall 21 of the frame 2 and the interior wall 32 of the cover 3 is formed as below.

Figure 4:
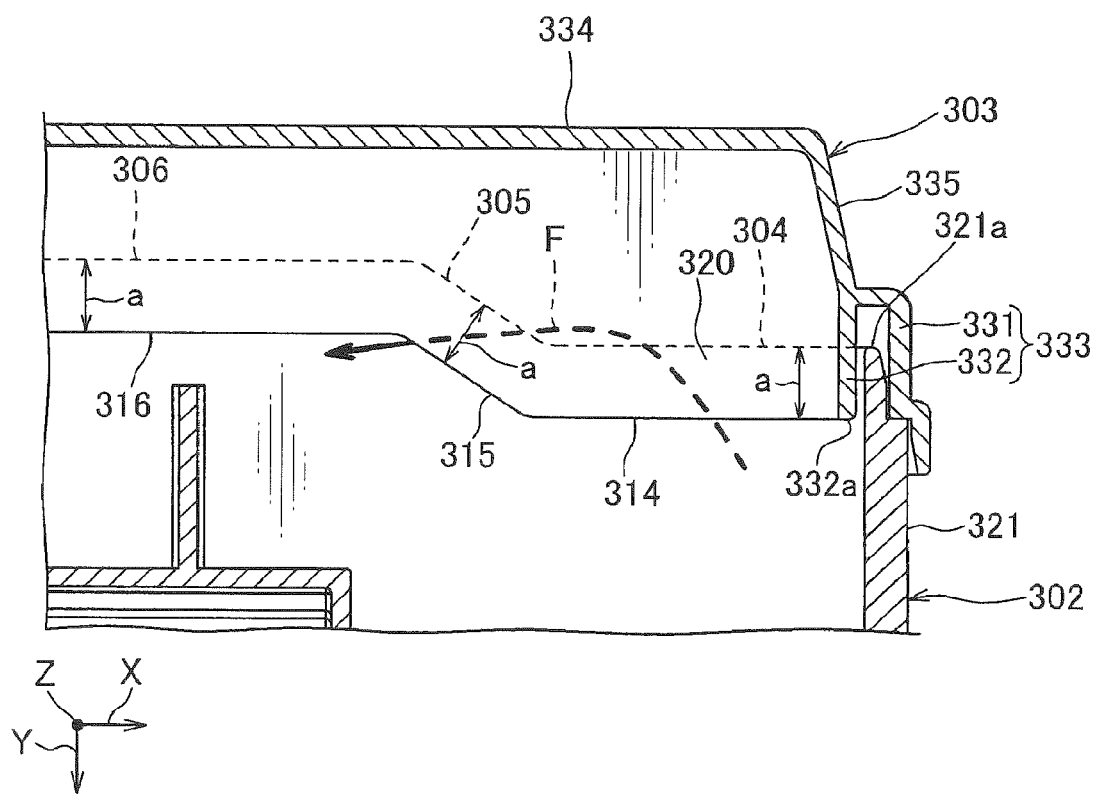
FIG. 4 is a cross sectional view indicating a conventional electrical junction box.
Figure 5:
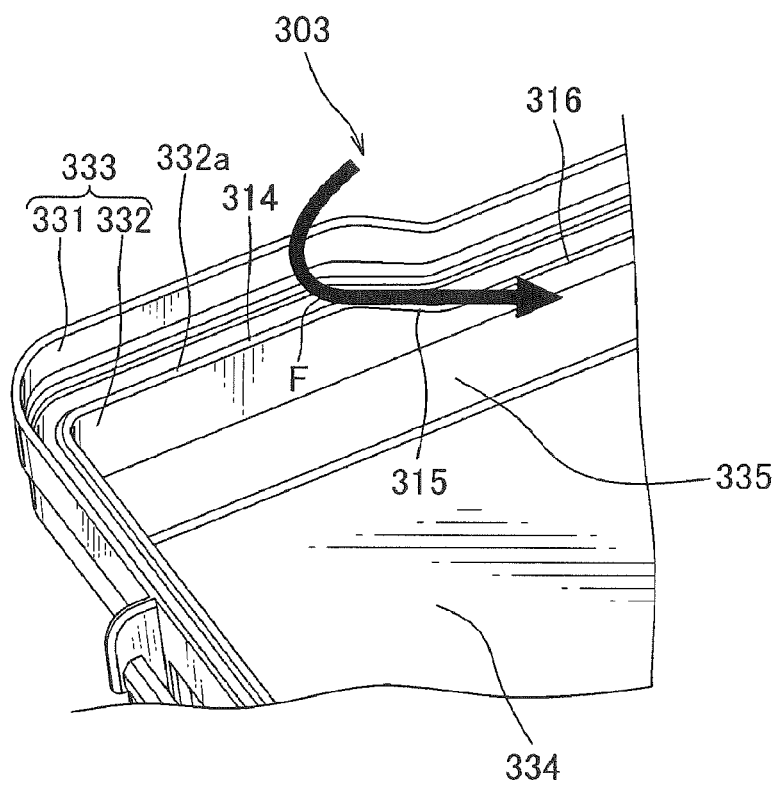
FIG. 5 is a perspective view indicating a part of a cover illustrated in FIG. 4.

Therefore, in a conventional embodiment, an edge at an interior wall of a cover and an edge at a peripheral wall of a frame are horizontally extended and a lapping amount between the peripheral wall of the frame and the interior wall of the cover are formed with a constant width over the entire periphery of the frame and the cover (see FIG. 4). Otherwise, in the present invention, as illustrated in FIG. 1, the inclination portion 15 in the interior wall 32 of the cover 3 is placed at the higher portion 16 nearer than the dashed line indicating the edge of the interior wall in the conventional embodiment. For this reason, a lapping amount "a+b" between the peripheral wall 21 and the interior wall 32 at the inclination portions 5 and 15 is formed larger than a lapping amount "a" at the lower portions 4 and 14. Also, a lapping amount "a" at the higher portions 6 and 16 are formed as same as a lapping amount "a" at the lower portions 4 and 14, except for the boundary portion of the inclination portions 5 and 15.

Also, in the present invention, a lapping amount between the peripheral wall 21 and the interior wall 32 is defined as a distance from an intersection between a vertical line and the edge 21a to an intersection between the vertical line and the edge 32a. In addition, the vertical line is drawn from the edge 21a of the peripheral wall 21 to the edge 32a of the interior wall 32.

Also, the electrical junction box 1 described above does not provide a packing so as to waterproof an engaged portion between the frame 2 and the cover 3, but provides a drainage structure that drain water entered from the engaged portion between the frame 2 and the cover 3 out of the frame 2. In other words, the water entered from between the exterior wall 31 of the cover 3 and the peripheral wall 21 of the frame 2 flows between the peripheral wall 21 and the interior wall 32 of the cover 3, and drains through between the peripheral wall 21 and the waterproofing wall 22 out of the frame 2 with slowly falling by own weight. Further, although the waterproofing wall 22 may be provided over the entire periphery of the frame 2, a portion that may not interfere with water entering may not be provided.

Also, although the neighborhood of the inclination portions 5 and 15 described above at the engaged portions between the frame 2 and the cover 3 is a portion that enter water more easily than other portions, in the electrical junction box 1 of the present invention, as described above, a lapping amount between the peripheral wall 21 and the interior wall 32 at the inclination portions 5 and 15 is formed larger than other portions. For this reason, water blows from the neighborhood of the inclination portions 5 and 15 into the frame 2, in other words, water scatters in the frame 2, and water is prevented splashing to a relay, a fuse, or the like. For example, as illustrated with an arrow D in FIGS. 1 and 3, when strong water such as high pressure cleaning water splashes the neighborhood of the inclination portions 5 and 15, even if the water enters from between the exterior wall 31 of the cover 3 and the peripheral wall 21 of the frame 2, flows to the higher portions 6 and 16, and reaches to a lapping portion between the peripheral wall 21 and the interior wall 32 at the inclination portions 5 and 15, strength of the water is weakened and drained through between the peripheral wall 21 and the waterproofing wall 22 out of the frame 2 with slowly falling by own weight.

The electrical junction box 1 may prevent that water blows from the engaged portion between the frame 2 and the cover 3 into the frame 2 without utilizing the packing.

Also, in the exemplary embodiment described above, although a case that the double wall 33 is provided to the cover 3 is described, for example, when a single wall that does not have the cover 3 in the interior wall 32, the inclination portion 5 of the peripheral wall 21 in the frame 2 is placed near the lower portion 4 than a position illustrated in FIG. 1 so that a lapping amount between the peripheral wall 21 and the exterior wall 31 of the cover 3 at the inclination portion 5 may be formed larger than other positions.

Furthermore, the aforementioned embodiments are only shown some representatives of the present invention, and the present invention is not limited of these embodiments. Therefore, it can be performed with several changes without deviating from the scope of the present invention.

REFERENCE SIGNS LIST 1 electrical junction box
2 frame
3 cover
4 lower portion
5 inclination portion
6 higher portion
20 opening portion
21 peripheral wall
31 exterior wall
32 interior wall
33 double wall

What is claimed is:

1. An electrical junction box comprising:
a frame including a peripheral wall and an opening portion surrounded by an edge of the peripheral wall; and a cover attached to the frame and covering the opening portion; the edge of the peripheral wall including: a lower portion; a higher portion; and two inclination portions connecting between the lower portion and the higher portion; a part of the cover overlapping near the edge of the peripheral wall, a lapping amount being defined by a distance between the edge of the peripheral wall and an edge of the cover, wherein the lapping amount at the inclination portions is formed larger than a lapping amount at the lower portion.

2. The electrical junction box according to claim 1, wherein a double wall formed of an exterior wall and an interior wall and positioning the edge of the peripheral wall between the exterior wall and the interior wall is provided to the cover, and wherein
a lapping amount at the inclination portion is formed larger than a lapping amount between the peripheral wall and the interior wall at the lower portion.

* * * * *